Jan. 10, 1933.  D. G. LILLEY  1,894,048

VARIABLE PITCH PROPELLER

Filed March 18, 1932  4 Sheets-Sheet 1

Inventor
Daniel G. Lilley.
By A. J. O'Brien
Attorney

Jan. 10, 1933.  D. G. LILLEY  1,894,048

VARIABLE PITCH PROPELLER

Filed March 18, 1932  4 Sheets-Sheet 2

Inventor

Daniel G. Lilley.

By [signature]

Attorney

Jan. 10, 1933.   D. G. LILLEY   1,894,048
VARIABLE PITCH PROPELLER
Filed March 18, 1932   4 Sheets-Sheet 3
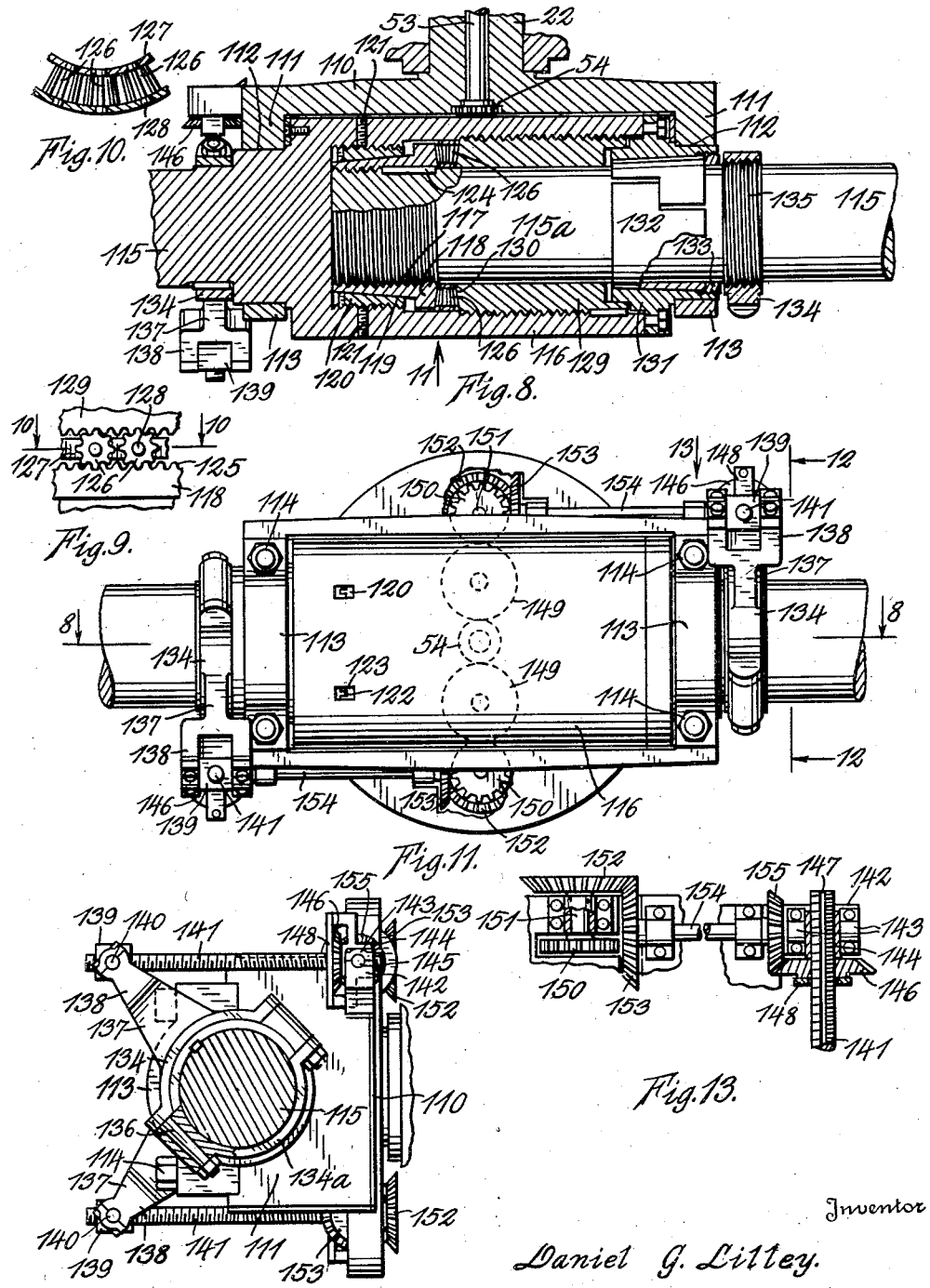

Jan. 10, 1933.  D. G. LILLEY  1,894,048
VARIABLE PITCH PROPELLER
Filed March 18, 1932   4 Sheets-Sheet 4
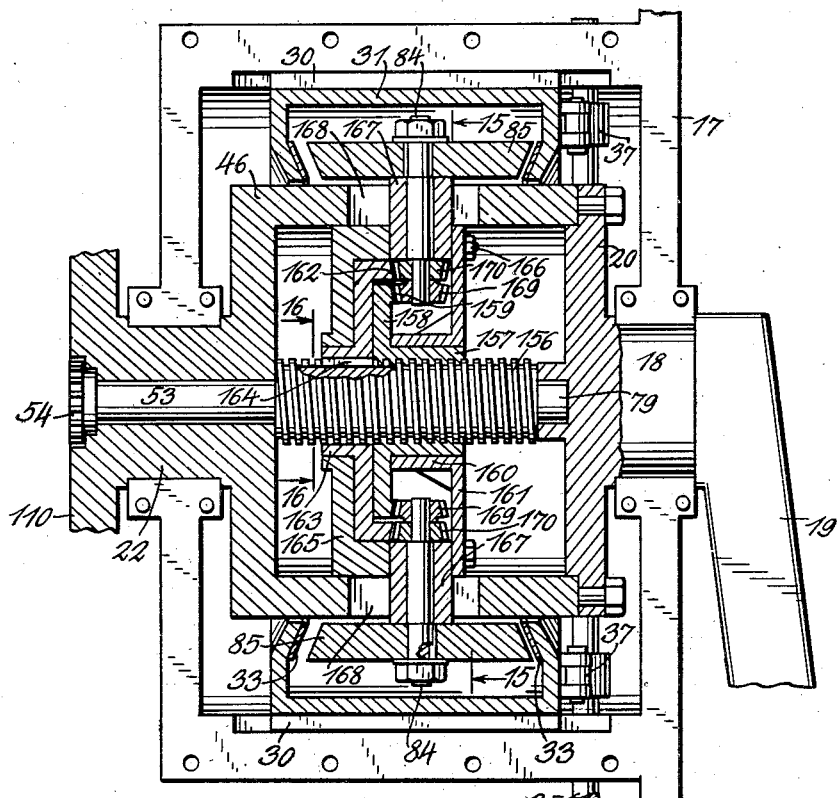
Fig. 14.
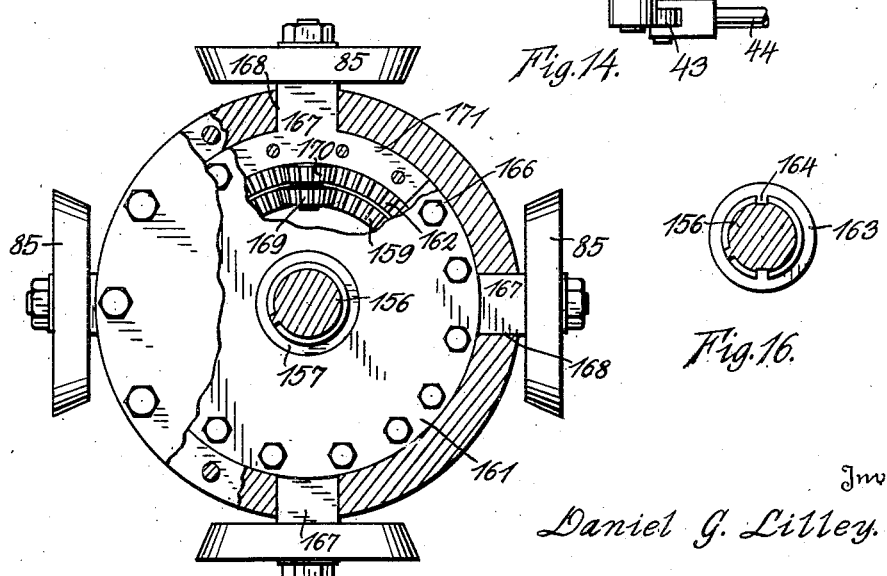
Fig. 15.   Fig. 16.
Inventor
Daniel G. Lilley.
By 
Attorney Patented Jan. 10, 1933

1,894,048

UNITED STATES PATENT OFFICE

DANIEL G. LILLEY, OF DENVER, COLORADO, ASSIGNOR OF ONE-HALF TO A. J. O'BRIEN, OF DENVER, COLORADO

VARIABLE PITCH PROPELLER

Application filed March 18, 1932. Serial No. 599,609.

This invention relates to improvements in mechanisms for use in adjusting a member attached to a rotating shaft while the shaft is rotating and by means of power obtained from the rotation of the shaft and has reference more particularly to a mechanism for use in connection with variable pitch propellers for aeroplanes and airships.

It has long been recognized that it is desirable to change the pitch of an aeroplane or airship propeller so as to adapt the same to conform to the increased forces required during starting and so as to increase the speed of the aeroplane or airship after it has come under headway and many mechanisms have been designed and patented for accomplishing this purpose.

In United States Letters Patent No. 1,712,708, granted to me on 14th day of May, 1929, I have shown, described and claimed one mechanism for varying the pitch of propeller blades, while in motion and in my copending application Serial No. 420,402, filed on the 13th day of January, 1930, I have shown, described and claimed another mechanism for this purpose.

It is the object of this invention to produce a simple and substantial mechanism that can be incorporated in any airship or aeroplane propeller driving device and by means of which the pitch of the propeller blades can be varied so as to increase or decrease the same to any desired extent while the parts are rotating at any speed.

Another object of this invention is to produce a mechanism that shall be so constructed that it will automatically become inoperative at each limit of variation so as to avoid all danger of breakage during operation.

Another object of this invention is to provide a drive shaft having associated therewith a transmission member that is concentric with the drive shaft and which can be operated in either of two directions with respect to the drive shaft while the latter is rotating and which shall also carry means for limiting such movement at the end of a predetermined adjustment.

A still further object of this invention is to produce a mechanism of the class described in which the rotating parts shall be located as near to the center of rotation as possible so as to limit the strains due to centrifugal force and also to permit the mechanism to be made as compact as possible.

Another object of this invention is to provide a pitch varying mechanism with means to indicate the extent of movement so that the pilot will always be able to tell exactly at what pitch his propeller is operating.

A still further object of this invention is to produce a hub construction that shall be especially adapted for use with the transmission mechanism and in which the centrifugal force produced by the blades as they revolve will be resisted by bearings connected with the blades themselves so as to remove this centrifugal strain from the end of the drive shaft and thereby simplify the construction of the hub and of the blades.

The above and other objects that may become apparent as this description proceeds are attained by means of a construction and an arrangement of parts that will now be described in detail, and for this purpose reference will be had to the accompanying drawings in which the invention has been illustrated in its preferred form, and in which:

Fig. 8 is a section taken on line 8—8, Fig. 11, and shows the means employed for connecting the two propeller blades and for securing them to the drive shaft;

Fig. 9 is a detail showing a modified form of roller thrust bearing;

Figure 10 is a section taken on line 10—10, Fig. 9;

Fig. 11 is a front elevation of the parts shown in Fig. 8 looking in the direction of arrow 11;

Fig. 12 is a section taken on line 12—12, Fig. 11;

Fig. 13 is a view looking in the direction of arms 13 in Fig. 11, parts being broken away to better disclose the construction;

Fig. 14 is a section similar to that shown in Fig. 1, but showing a mechanical means substituted for the hydraulic means illustrated in Fig. 1;

Fig. 15 is a section taken on line 15—15, Fig. 14, with parts broken away and other parts shown in elevation; and Fig. 16 is a section taken on line 16—16, Fig. 14.

Figure 1:
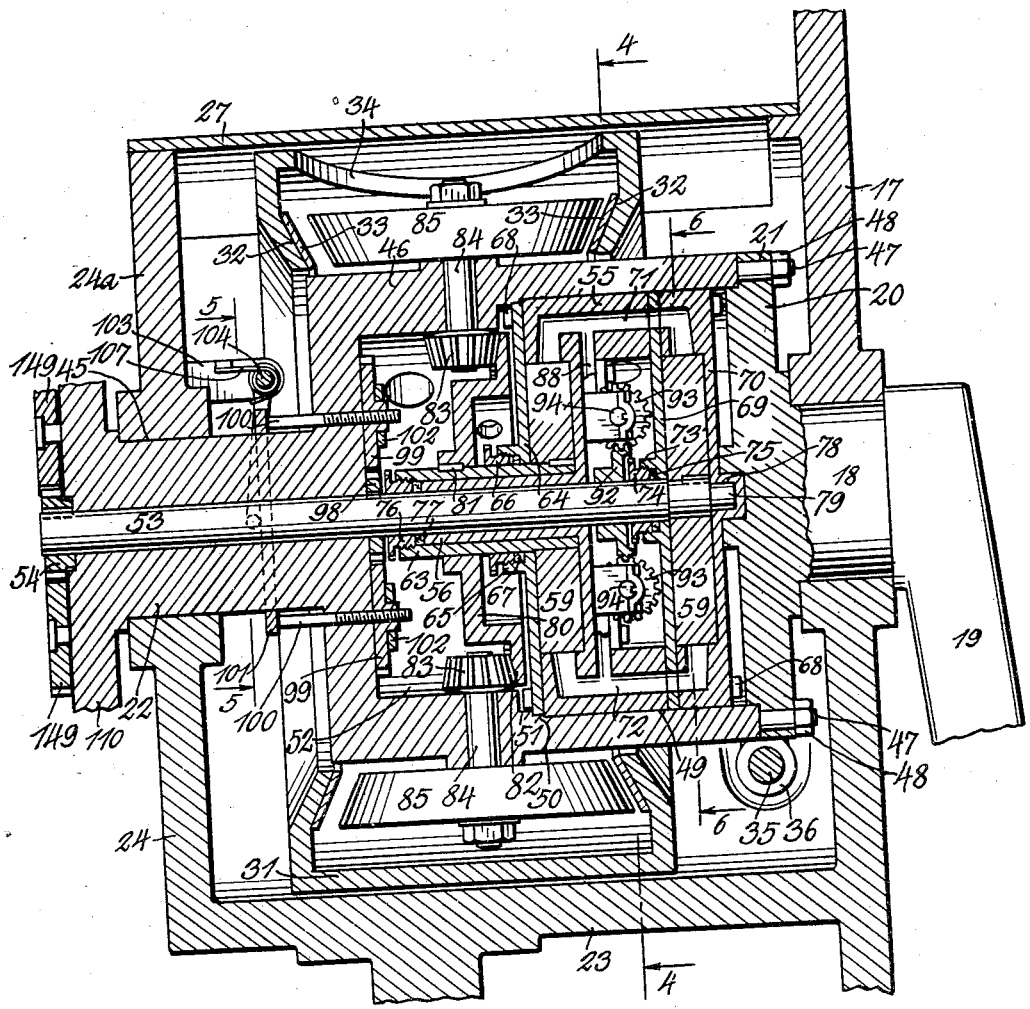
Fig. 1 is a diametrical section through one end of the crank shaft showing a hydraulic mechanism for operating the independent axial shaft or transmission member.

In the drawings reference numeral 17 designates the wall of the crank casing of an internal combustion engine and reference numeral 18 indicates a portion of the crank shaft, one crank arm of which has been indicated by reference numeral 19, one end of the crank shaft has a flange 20. This flange is provided with a number of openings 21 spaced equidistantly around its periphery and adapted to receive bolts for securing thereto the drive shaft 22.

Figure 4:
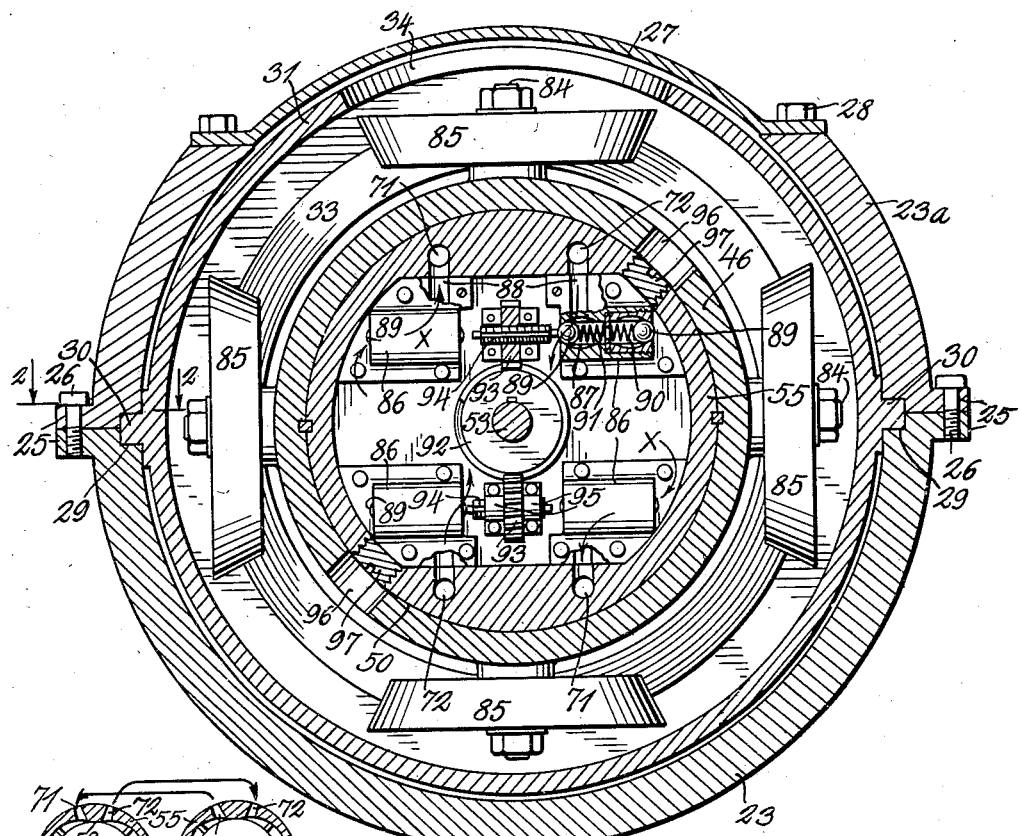
Fig. 4 is a section taken on line 4—4, Fig. 1.

The crank casing is preferably provided with an integral forward extension whose bottom wall has been designated by reference numeral 23 and whose front wall has been designated by reference numeral 24; the housing of which walls, 23 and 24 form a part, is made of two members divided on a horizontal line as indicated in Fig. 4, the upper part has been designated by reference numerals 23a and 24a, the two parts 23 and 23a are provided with flanges 25 that are perforated for the reception of bolts 26 by means of which they are held in assembled relation. The upper part of the wall 23a is cut away as shown in Fig. 4 and the opening thus formed is closed by means of a cover 27 which is held in place by means of bolts 28. When the cover 27 is removed, access can be had to the interior of the housing. At the place where the two sections 23 and 23a come together a groove 29 has been provided. Located inside of the housing and provided with outwardly extending projections 30 that fit into the groove 29 is an annular friction drive member 31. This member is provided with two annular inwardly inclined surfaces 32 that are preferably covered with asbestos 33 or some other friction material resembling that employed for automobile brakes. The cylindrical part of member 31 is provided with an opening 34 at its top so that when the cover 27 is removed, access may be had to the parts located within the member 31.

For the purpose of moving the annular member 31, a shaft 35 has been provided. This shaft is mounted for rotation in bearings 36 and is provided within the housing with two spaced cranks 37. The upper ends of the cranks are separated so as to form two fingers 38 and the connecting rod 39 has one end located between the fingers 38 and is pivotally attached to the latter by means of pivot pins 40. The member 31 is provided with two pairs of ears or lugs 41 between which the other ends of the links 39 extend and to which they are pivotally connected by means of pins 42. The outer end of shaft 35 is provided with a crank 43 to which a rod 44 is pivotally attached. The rod 44 extends to the cabin of the aeroplane and terminates in a lever located near the pilot seat and by means of which he can rock the shaft 35 about its axis, thereby moving the annular member 31 longitudinally within the housing. The effect of moving member 31 in either direction will be explained as the description proceeds.

Figure 7:
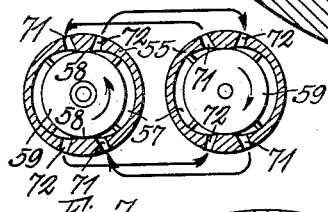
Fig. 7 is a diagrammatic representation showing the relative positions of the motor and pump parts and indicating the conduits through which the liquid flows in passing from one to the other.
Figure 6:
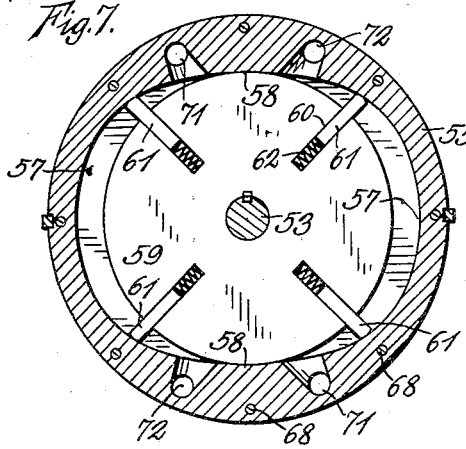
Fig. 6 is a section taken on line 6—6, Fig. 1, and shows the stator and rotor of the hydraulic motor.

Drive shaft 22 is journalled in a bearing 45 formed in the two vertical walls 24 and 24a and has a cylindrical hollow portion located within the housing. The wall of this cylindrical portion has been designated by reference numeral 46. The inner end of the cylindrical wall is provided with a number of bolts 47 that extend through the openings 21 in flange 20. The outer ends of these bolts are threaded for the reception of the nuts 48. It is evident that when bolts 47 are in place and nuts 48 are tightened, the drive shaft 22 will be firmly secured to the crank shaft 18 so as to form a substantially unitary structure. The axis of drive shaft 22 is, of course, concentric with the axis of the crank shaft 18. The inner surface of wall 26 is cylindrical and is formed of several sections of different diameters. The section that has been indicated by reference numeral 49 is the largest in diameter and this terminates in two short cylindrical sections 50 and 51, which, in turn, terminate in a cylindrical section 52. Located within the cylindrical chamber formed by the wall 46 is a hydraulic pump and motor together with mechanism for operating the same which will now be described. Before the construction of the pump and motor are described, attention will be called to the fact that the drive shaft 22 is provided with an axial opening in which is located an independently movable shaft 53. This shaft extends entirely through the drive shaft 22 and through the cylindrical space within the wall 46. A gear wheel 54 is secured to the front end of shaft 53. Located within the chamber bounded by the wall 46 is a motor casing which has been indicated in its entirety by reference numeral 55. This casing is provided with an elongated hub 56 through which the shaft 53 extends and which forms a bearing in which the shaft may rotate. The front surface of member 55 is provided with a chamber having two similarly curved walls 57 that terminate in short arcuate surfaces 58 that are concentric with the shaft 53. Located within the chamber in the pump is a rotor 59 that is constructed in the manner shown in Fig. 6. The rotor is cylindrical and is provided with a number of radial slots 60 of which four have been shown in the drawing, but a larger number may be used if desired. Located within each radial slot is a blade 61 that is biased outwardly by means of a spring 62. It will be seen from Fig. 6 that when the rotor is turning the blade 61 will move inwardly and outwardly so as to always keep in contact with the surface 57. The type of rotary pump that has just been described and which is shown in Figs. 6 and 7, is old and well known, and therefore the description will not be gone into in detail, but only such description will be given as is believed to be necessary to convey a correct understanding of the operation. The rotor 59 is keyed to one end of a cylindrical sleeve 63 that is mounted for rotation on the hub 56. A cover plate 64 has a central opening through which the sleeve 63 passes and is provided with a hub 65 with which is operatively connected an annular nut 66 that serves to compress packing material located in the opening 67. The periphery of plate 64 is secured to the front side of the pump housing by means of bolts 68. The rotor is made of the proper thickness to contact with the parallel opposing surfaces of the pump housing and the cover plate 68 so as to reduce to a minimum any leakage of oil. The only place where the oil can escape is between the member 64 and the sleeve 63 and this is guarded against by means of the packing gland shown. The pump housing is provided with a central opening on the rear side thereof, and has secured to it a cover plate 69 that forms one wall of the motor housing. The motor and the pump are constructed in an identical manner and therefore the parts have been given the same reference numerals. The housing for the motor is completed by member 70 and the four parts, namely, members 55, 64, 69 and 70 are held in assembled relation by means of bolts 68 that extend entirely through the four parts. Connecting the pump and the motor are conduits 71 and 72. These conduits permit the liquid to flow in a manner which will be hereinafter explained. The cover plate 69 is provided with a hub 73 with which is associated an annular nut 74 that serves to compress packing material located in the space 75. In order to more fully guard against escape of liquid, the front end of sleeve 63 extends a short distance from the front of hub 56 and has secured to it an annular nut 76 that serves to compress packing material located in the annular opening 77. The housing for the motor is provided with a central bearing 78 in which the rear end 79 of shaft 53 is journalled. Secured to the sleeve 63 is a gear wheel 80. This gear is held against rotation by means of a key 81 and is provided with a ring 82 of gear teeth which are in operative engagement with the pinions 83 that are secured to the inner ends of the radial shafts 84. These shafts are journalled in suitable bearings in the wall 46 and have secured to their outer ends friction gears 85 whose surfaces are beveled to conform to the inclination of the friction surfaces 33. By means of shaft 35 the annular member 31 can be moved so as to bring either of the surfaces 33 into engagement with the friction gears 85.

Let us now assume that the parts so far described have been assembled as shown and that the crank shaft 18 is rotating. As long as neither of the surfaces 33 come in contact with the friction gears 85, the parts secured to the wall 46 and located within the opening therein, will rotate with the same speed as the crank shaft without moving relative to the latter. If shaft 35 is turned so as to bring one of the friction surfaces 33 into contact with the friction gears 85, the latter will start rotating and through the medium of the pinions 83 will rotate the gear 80 and since this is keyed to the sleeve 63 to which the rotor 59 of the pump is attached, the latter will begin turning in the pump casing and will force oil through the passages 71 and 72 into the motor and the rotor 59 of the motor will then start turning thereupon rotating the shaft 53 relative to the drive shaft 22. It is evident that if the member 31 is now moved in the opposite direction until the other surface 33 comes in contact with the opposite sides of the friction gears 85, the parts will rotate in the opposite direction and thus cause the shaft 53 to rotate in the opposite direction with respect to the drive shaft, and it is therefore evident that it is possible to move the shaft 53 in either of two directions relative to the drive shaft while the latter is turning and by means of power derived from the rotation of the drive shaft.

Unless some means were provided to limit the extent of the rotation of the shaft 53 in either direction, it would continue to turn as long as either one of the friction surfaces 33 were in contact with the friction gears. When a propeller or other body is to be moved relative to the drive shaft some means must be provided for limiting this movement in order to prevent breakage or severe strains to develop and for this purpose a limiting mechanism has been provided which will now be described.

It will be apparent from an inspection of Figs. 6 and 7, that either of the conduits 71 or 72 may conduct the liquid from the pump to the motor under pressure, depending upon the direction in which the pump is rotating. When the parts are operating one of the conduits 71 or 72 will carry liquid under pressure and if a by-pass were obtained so as to return the liquid to the pump without requiring it to pass through the motor, the pump would continue to operate without effecting rotation of the motor. For the purpose of by-passing the liquid so as to stop the operation of the motor, each of the conduits 71 and 72 have been connected with a valve mechanism which has been shown most clearly in Fig. 4. These valves are all alike and each consists of a body member 86 that is provided with a central opening 87. This opening is connected by means of a passage 88 to one of the conduits. The ends of the central opening 87 are normally closed by means of ball checks 89 that are biased towards closed position by means of springs 90 and 91. The springs 90 are preferably weaker than the springs 91 for a purpose which will hereinafter appear. When the conduit 72 carries liquid under pressure, the liquid enters the chamber 87 and exerts a force on the balls tending to move them outwardly against their seats and consequently none of the liquids can escape through this valve. If the conduit 72 becomes the intake to the pump, then the pressure in the same is below atmospheric and any oil contained in the chamber in which the valves are located can pass inwardly through the outer end of the valve mechanism and into the pump. For the purpose of opening the valve when the independent shaft 53 has turned a predetermined number of revolutions with respect to the drive shaft, the independent shaft has been provided with a worm 92 that is operatively connected with a worm gear 93. Worm gear 93 is mounted on a threaded shaft 94 that is journalled in bearings 95. The threaded shaft is provided with a key slot that keeps it from turning in the bearings and therefore when the worm gear 93 is rotated, it will move the shaft to the right or to the left, depending upon the direction of rotation of the shaft 53. The ends of the shafts 94 are provided with points that engage the ball 89 of the valve mechanism and serve to move the ball away from the seat and after this has been accomplished, the oil or other fluid, instead of passing to the motor, flows through the passage 88 and by the ball 89 in the direction indicated by the arrow in Fig. 4 and into the chamber containing the valves. This oil is then returned to the pump by passing inwardly through one of the valve mechanisms connected with the intake of the pump as indicated by arrow X in Fig. 4. Since the liquid enters the chamber under pressure, it is forced back into the pump and does not have to depend on atmospheric pressure for this purpose. After the valves have been opened in the manner described, the motor will cease functioning and no further relative movement can be had between the drive shaft and the independent shaft until the member 31 has been shifted so as to bring the other friction surface into engagement with the friction gears 85 and rotate them in opposite direction, whereupon the conduits that formerly contained liquid under pressure will become the intake conduits for the pump and the liquid will be passed to the motor through the other conduits whereupon the motor will rotate in the opposite direction, thereby setting up a movement that tends to move the threaded shafts 94 towards the valves on the other side and the parts will then continue to function until the valves that are now connected with the pressure conduits, are opened, whereupon the motor will cease to operate.

The means just described, and which is operated by the relative movement between the independent shaft and the drive shaft serves to automatically limit the extent of movement of the independent shaft relative to the drive shaft as the latter is rotating about its axis. This limiting means is considered to be of great importance in a mechanism of this type because without some limiting means of this kind, the parts will be liable to strains that might cause breakage and the operator would be obliged to exercise exceeding care to see that the mechanism was stopped before such strains occurred. I am aware that mechanisms for adjusting propeller blades have been provided with limit stops, but as far as I am advised none of them are operated by the relative movement between the drive shaft and an independent transmission member carried by the drive shaft.

In order to be able to introduce oil into the chamber containing the valve mechanisms, the wall 46 has been provided with two or more diametrically located openings 96, and the wall of the pump housing is provided with a corresponding number of openings correspondingly located and which are normally closed by means of plugs 97. By removing one of the plugs, oil can be introduced and it is also possible to introduce a tool through these openings for the purpose of tightening the packing in the packing boxes, if this should become necessary. Since there are three packing boxes, I have provided three sets of openings as indicated in Fig. 1, and by introducing a suitable tool through these openings, the packing boxes can be tightened if required. The openings must be symmetrically located so as not to affect the balance of the parts because they are rotating at a high speed and if an unbalanced condition is present, vibrations will be set up.

It is desirable, although not absolutely essential, that some indicating mechanism shall be provided by means of which the pilot can tell at a glance at what pitch his propeller is operating and for this purpose the shaft 53 has been provided with a gear wheel 98 that is in mesh with two or more gears 99. The gears 99 have a threaded connection with bolts 100 that pass through the wall and are connected at their outer ends to a ring 101. Gears 99 are held against movement inwardly by means of plates 102. When shaft 53 turns relative to the drive shaft, the gears 99 will rotate relative to the bolts 100 and move the ring 101 in the direction of the axis of the drive shaft. Projecting rearwardly from the inner surface of the walls 24a are lugs 103 in which is journalled shaft 104. Secured to this shaft are arms 105 that are provided at their free ends with pins 106 that are engaged by the ring 101. A spring 107 is provided and so connected with the shaft 104 and the arms 105 that it tends to hold the pins 106 against the front surface of ring 101. When the ring 101 is moved, the shaft 104 will be rotated in a corresponding manner and this rotation is transmitted by means of a crank arm 108 and a connecting rod 109 to a suitable indicator located in such a position that it can be seen by the pilot. The indicator can pass over a scale suitably graduated to show the pitch of the propeller blades.

When the mechanism that has been described above is used for varying the pitch of the propeller blades, the front end of drive shaft 22 is provided with two radial arms 110. The ends 111 of these radial arms are bent at right angles as shown in Fig. 8 and are each provided with a semi-circular bearing surface 112. Bearing caps 113 are secured to the ends 11 by means of bolts 114 and when these are in place, circular bearings are formed for holding the propeller blade assembly which will now be described. The root portions of the propeller blades have been indicated by reference numeral 115 and one of these roots portions terminate in a hollow cylindrical part 116. The other propeller blade has a root portion of substantially the same diameter throughout its length and which is inserted into the opening in the cylindrical part 116. The inner end of the root portion 115a is threaded as indicated at 117 and secured to this threaded portion is a hollow member 118 whose outer surface is frustoconical in shape as indicated at 119. Threaded to the wall of the opening in member 116 is a ring 120 whose inner surface is tapered to conform to the tapered surface 119. This ring is held in adjusted position by means of set screws 121. The end of ring 120 is provided with teeth 122 and the wall of member 116 has openings 123 through which tools may be inserted for the purpose of turning the ring 120 so that it can be adjusted without taking the assembly apart. Member 118 is held against rotation by means of a key 124. The outer end of member 118 is tapered slightly and provided with gear teeth 125 with which a number of pinions 126 cooperate. These pinions are attached to a ring 127 by means of pivot pins 128. A cylindrical thrust member 129 has a threaded connection with the inner surface of the opening in member 116 and its inner end which has been designated by reference numeral 130 is provided with teeth that cooperate with the pinions in a manner shown in Figs. 9 and 10. The pinions 126 take the place of rollers and form a thrust bearing that resists the centrifugal strains that are developed when the shaft and the propeller rotates. Secured to the open end of member 116 is a bearing member 131. The inner surface of this bearing member is tapered and cooperates with a tapered ring 132 that is carried by the root portion 115a. The position of ring 132 is adjusted by means of a threaded ring 133. From the description just given it will be seen that the two propeller blades whose root portions have been indicated by reference numeral 115 are so attached to the drive shaft that they can rotate in the bearings 112 and also rotate with respect to each other. The centrifugal strains are taken care of by the thrust bearing connection and the overlapping arrangement of the roots give long bearing surfaces that reduce the strains to a minimum. Secured to the root portion 115a is a clamp 134. The root portion is preferably provided with a threaded section 135 with which threads on the inner surface of the clamping member engage. The clamping member is composed of two parts 134 and 134a which are held in assembled position by means of bolts 136 in the manner shown in Fig. 12. That part of the clamping member that has been indicated by 134 is provided with a radial arm 137 whose outer end is formed by two parts 138 that are separated a short distance and between which is located a nut 139 that has two trunnions 140 that are journalled in bearings provided at the outer ends of members 138, as shown in Fig. 12. Threadedly connected with nuts 139 are threaded rods 141. These rods are threaded throughout their entire length and one-half of the threaded surface is a right hand thread and the other half is a left hand thread in the manner shown in Fig. 12. The radial arms are provided with projections 142 which carry two bearings 143 between which is located a nut 144 that has two oppositely extending trunnions 145 that are journaled in the bearings 143. The inner end of the threaded rods 141 extend through the nut 144. Carried by the threaded rod 141 is a beveled gear 146 that is provided with a spline that engages a keyway 147 in one side of the threaded rod. One surface of the gear 146 is in contact with one end of the nut 144 and the other surface is in contact with a plate 148 that is attached to the nut 144 in the manner shown in Fig. 12. Whenever the gear wheel 46 is rotated, it will rotate the threaded rod and since the opposite ends of this rod are provided with right and left hand threads, the rod will move simultaneously through the nuts 139 and 144 and will turn the crank arms 137, thereby adjusting the propeller blades rotarily. There are two of these rods in the manner shown in Fig. 12 and the mechanism for operating each is identical and therefore the description above will cover both of them. It is now necessary to describe how the relative rotation of shafts 22 and 53 will effect rotation of the propeller blades about their axes and for this purpose reference will be had more particularly to Figs. 11, 12 and 13. It has already been described that the front end of shaft 53 has a gear wheel 54 and from Fig. 11 it will be seen that gear 54 is in mesh with two idlers 149 that in turn are in mesh with gears 150. Gears 150 are connected by means of shafts 151 to bevelled gears 152 and these in turn are operatively connected with bevel gears 153 secured to one end of the shaft 154. Secured to the other end of the shaft 154 are bevel gears 155 that are in mesh with the gear 146. It will now be apparent that whenever the gear 54 rotates relatively to the drive shaft, it will set in motion the train of gears shown and described and will cause the threaded rods 140 to rotate about their axes, thereby moving the propeller blades rotarily about their common axis. Since the crank arms 137 are located on opposite sides of the centers of the propeller blades, the corresponding rotation of the threaded rod 141 will rotate the propeller blades in opposite directions. After an adjustment has been effected, the parts will be positively held in adjusted position by the threaded connection between the rods 141 and the nuts 139 and 144. The maximum and minimum pitch is determined by the setting of the threaded shafts 94 which have previously been described so that the pilot can move the propeller blades from maximum to minimum pitch and vice versa without necessitating any investigation on his part because these two portions are mechanically determined. If any intermediate position is to be used, he can adjust the parts by means of the indicator to any intermediate position desired.

The mechanism above described employs a hydraulic motor and a pump for effecting relative movement between the drive shaft and the independent shaft. It is not necessary, however, to resort to hydraulic means for this purpose as substantially the same results can be obtained by mechanical means and as an example of such mechanical means, reference will be had to Figs. 14, 15 and 16, where one is shown. In the embodiment illustrated, the shaft 53 is provided with a threaded section 156 which carries a nut 157. This nut has a radial flange 158 that terminates in a beveled gear 159. The outer surface of the nut is cylindrical and telescopically connected with it is the hub 160 of a circular plate 161. A beveled gear 162 is provided with a hub 163 that has an opening of the proper size to receive the threaded portion of the shaft. The shaft has a keyway cut therein and the hub 163 carries a spline 164 that engages in the keyway and therefore whenever gear 162 is rotated, it will also rotate the shaft 53. The two bevel gears 159 and 162 are enclosed in an opening in a member whose cylindrical wall has been designated by 165. This member has a circular wall that has an opening through which the hub 163 extends. The plate 161 is secured to the member 165 by means of bolts 166. It will now be seen that the two gears 159 and 162 can rotate in the chamber formed by members 165 and 161, but that they will be held against relative movement in the direction of the length of the shaft 53. Member 165 has a radially extending bearing 167 that projects outwardly through an elongated slot 168 in the wall 46. Journalled in bearing 167 is a shaft 84 to the outer end of which is attached a bevel gear 85. This bevel gear is located between the two friction surfaces 33 of the movable member 31 in the manner described in connection with Fig. 1. Secured to the inner end of shaft 84 are two pinions 169 and 170. These pinions have been shown as of the same size, but since the pitch diameter of gear 159 is less than that of gear 162, it is evident that when the shafts 84 are rotated, the bevel gear 159 will be rotated faster than the one indicated by reference numeral 162 and therefore nut 157 will be given a relative rotary movement with respect to the shaft 53, which will carry the assembly comprising the several gears and the friction gears 85 in the direction of the length of the shaft 53. The parts are so made that the gears 85 will tend to move away from the friction surface with which they are in contact so that in order to secure an extended movement of the parts, member 33 will have to follow the movement of the gears 85 until the desired adjustment is effected. This movement of the parts in the direction of the axis of rotation constitutes an automatic means for limiting the extent of movement, as by this simple expedient, the parts will move only a short distance at each contact between the friction surface 33 and the gear wheel 85 and the pilot must therefore follow the movement of the gear wheels 85 by a corresponding movement of member 31. The adjustment of member 31 is effected by substantially the same means as has already been described which means comprises the shaft 35 and crank arm 37, the only difference being that in the construction shown in Fig. 14, the links 39 have been omitted so as to save space.

Figure 5:
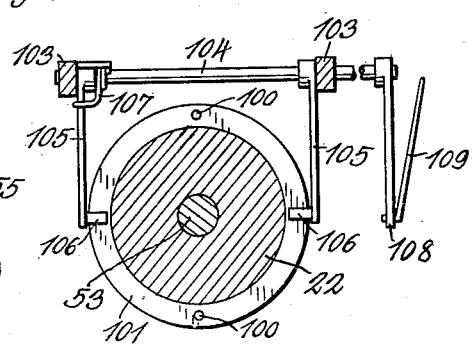
Fig. 5 is a section taken on line 5—5, Fig. 1, and shows a part of the indicator.

In the embodiment shown in Fig. 14, the indicator has not been illustrated, but an indicator constructed substantially as shown in Fig. 5 can be used with this mechanism, if desired.

Although this invention has been described in connection with a propeller such as that employed with aeroplanes and airships, it is to be understood that this is merely an example and that the mechanism can be used for adjusting any member relative to a rotating member, while both of them are turning about an axis and the mechanism is therefore not limited to propellers, but can be used also, for example, in connection with variable speed belt drives employing V-shaped belts, as well as many other purposes. The shaft 18, instead of being a crank shaft can be driven by belts or gears from any suitable prime mover.

Attention is again directed to the fact that, in the embodiments illustrated and described, the drive shaft has an axial opening through which an independently movable shaft 53 extends and means is provided for turning shaft 53 in either direction relative to the drive shaft while the latter is turning about its axis and employing for this purpose power derived from the rotation of the drive shaft.

Attention is also directed to the fact that an automatically operated means is provided which is caused to function by the relative movement of the drive shaft and the independent shaft for limiting the movement of the independent shaft to any desired extension.

Figure 2:
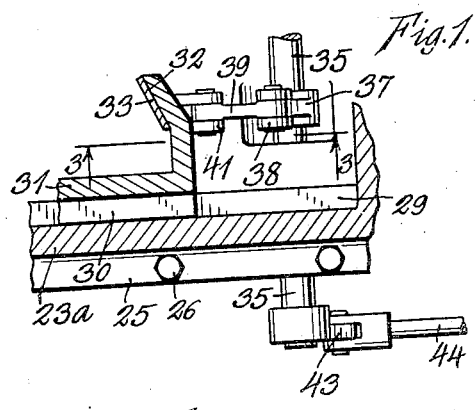
Fig. 2 is a section taken on line 2—2, Fig. 4, and shows the means employed for moving the member having the two annular friction drive surfaces.
Figure 3:
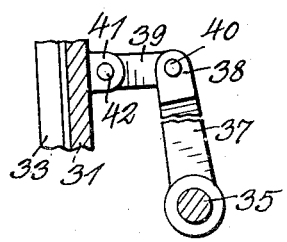
Fig. 3 is a section taken on line 3—3, Fig. 2.

Attention is called at this point to Figs. 2 and 14 and to the fact that the ends of the channel or groove 29 function as stops which positively limit the movement of member 31 because when the ends of the ribs 30 strike the ends of groove 29, further relative movement becomes impossible in that direction. The construction shown in Figs. 14 and 15 requires stops for limiting the movement of member 31 because if no stops were provided nuts 139 might be removed from the bolts 141 or the parts might be put under excessive strains if the operator failed to release the friction gears at the proper time.

Having described the invention what is claimed as new is:

1. In a device of the class specified, in combination, a drive shaft mounted for rotation about its own axis and provided with an axial opening, an independent shaft in the axial opening, a member carried by the drive shaft and rotatable therewith, but capable of being moved with respect thereto, means drivably connecting the member to the independent shaft, so the member will be moved with respect to the drive shaft whenever the independent shaft is moved relative thereto, means for moving the independent shaft relative to the drive shaft by power derived from the rotation of the latter, and means operated by the relative movement between the independent shaft and drive shaft for automatically limiting the extent of movement of the independent shaft and body relative to the drive shaft as the latter is rotating about its axis.

2. In a device of the class described, in combination, a drive shaft mounted for rotation about its own axis, and provided with an axial opening, an independent shaft in the axial opening, a member carried by the drive shaft designed to be moved with respect thereto as it is rotated therewith, means interposed between the independent shaft and the said member for moving the member with respect to the drive shaft whenever the independent shaft is caused to move relative to the drive shaft, means for moving the independent shaft relative to the drive shaft, while the latter is turning about its axis, and means operated by the relative movement between the two shafts for limiting the extent of the relative movement between them.

3. In combination with a variable pitch propeller, a drive shaft mounted for rotation about its own axis, the drive shaft, having an axial opening, an independent shaft located in the axial opening, a propeller hub and propeller blades carried by the drive shaft, the blades being designed to be rotated about axes substantially perpendicular to the axis of the drive shaft while they are rotated therewith, means drivably interposed between the independent shaft and the propeller blades for moving them about their axes whenever the independent shaft is moved relative to the drive shaft, means for moving the independent shaft relative to the drive shaft, comprising a hydraulic pump and a hydraulic motor, carried by the drive shaft and rotatable therewith, the independent shaft being drivably connected to the hydraulic motor, conduits connecting the pump and motor, means for operating the pump by power derived from the rotation of the drive shaft, means comprising the pump for moving the motor and independent shaft relative to the drive shaft as the latter rotates about its axis, means operatively connecting the independent shaft with the drive shaft for limiting the extent of movement of the independent shaft and propeller blades relative to the drive shaft, said means comprising valves secured to the conduits that connect the pump and motor, means interposed between the valves and the independent shaft for operating the valves and controlling the amount of relative movement between the independent shaft and drive shaft.

4. In a variable pitch propeller, in combination, a drive shaft mounted for rotation about its axis, the drive shaft having an axial opening, an independent shaft located in the axial opening, a propeller hub carried by the drive shaft, propeller blades designed to be rotated about axes perpendicular to the axis of the drive shaft as they are rotated therewith, means drivably interposed between the independent shaft and the blades, so the latter will be moved about their axes whenever the independent shaft is moved relative to the drive shaft, means for moving the independent shaft relative to the drive shaft, comprising a hydraulic pump and motor, and a liquid supply reservoir, all interconnected by conduits, for the transfer of a liquid from one to the other, all carried by the drive shaft and rotatable therewith, the independent shaft being connected to the hydraulic motor, means for operating the pump by power derived from the rotation of the drive shaft, means comprising the pump for moving the motor and independent shaft relative to the drive shaft as the latter is rotating about its axis, and means interposed between the pump and motor and controlled by the relative movement of the independent shaft with respect to the drive shaft, for limiting the extent of movement of the independent shaft with respect to the drive shaft.

5. In a mechanism for the purpose specified, in combination, a drive shaft mounted for rotation about its own axis, a body carried thereby and movable with respect thereto, the drive shaft having an axial opening therein, an independent shaft located in the opening and movable with respect to the drive shaft, means for moving the independent shaft relative to the drive shaft with power derived from the rotation of the drive shaft and while the latter is turning, means for transmitting motion from the independent shaft to the body and for moving the latter in either of two directions relative to the drive shaft while the latter is turning about its axis, and means limiting the relative movement between the drive shaft and the independent shaft.

6. In a mechanism for the purpose specified, in combination, a drive shaft mounted for rotation about its own axis, a body carried thereby and movable with respect thereto, the drive shaft having an axial opening therein, an independent shaft located in the opening and movable with respect to the drive shaft, means for moving the independent shaft relative to the drive shaft with power derived from the rotation of the drive shaft and while the latter is turning, means for transmitting motion from the independent shaft to the body and for moving the latter in either of two directions relative to the drive shaft while the latter is turning about its axis, and means also carried by the drive shaft and rotatable therewith for limiting the relative movement between the drive shaft and the independent shaft.

7. In a variable pitch propeller, in combination, a drive shaft mounted for rotation, radial arms carried by the drive shaft, said radial arms having bearings that are formed in part by removable caps, the common axis of the bearings being substantially perpendicular to the axis of the drive shaft, propeller blades mounted for limited rotation in the bearings, the drive shaft having an axial opening, an independent shaft mounted in the opening for movement relative to the drive shaft, motion transmitting means for drivably connecting the independent shaft with the propeller blades, means for moving the independent shaft relative to the drive shaft and means also carried by the drive shaft and rotatable therewith for limiting the movement of the independent shaft and the propeller blades relative to the drive shaft.

8. In a variable pitch propeller, in combination, a drive shaft mounted for rotation, radial arms carried by the drive shaft, said radial arms having bearings, the common axis of the bearings being substantially perpendicular to the axis of the drive shaft, propeller blades mounted for limited rotation in the bearings, the drive shaft having an axial opening, an independent shaft mounted in the opening for movement relative to the drive shaft, motion transmitting means for drivably connecting the independent shaft with the propeller blades, means for moving the independent shaft relative to the drive shaft by power derived from the rotation of the latter and means also carried by the drive shaft and rotatable therewith for limiting the movement of the independent shaft and the propeller blades relative to the drive shaft.

9. In a variable pitch propeller, in combination, a drive shaft mounted for rotation, said shaft having an axial opening and provided with radial arms rigidly secured thereto, the radial arms having bearings, the axes of the bearings being substantially perpendicular to the axis of the drive shaft, a pair of propeller blades journalled in the bearings, the root portions of the blades of each pair being rotatably connected with each other, means for holding the two blades of each pair against relative movement in the direction of their length, means for rotating the propeller blades with respect to each other and with respect to the bearings, said means comprising an independent shaft located in the axial opening, means interposed between the independent shaft and the propeller blades for rotating the latter in their bearings whenever the independent shaft is moved relative to the drive shaft, means carried by the drive shaft and rotatable therewith for moving the independent shaft relative thereto, and means also carried by the drive shaft and rotatable therewith for limiting the movement of the independent shaft and the propeller blades relative to the drive shaft.

10. In a variable pitch propeller, in combination, a drive shaft mounted for rotation about its own axis, the drive shaft having radial arms secured thereto, so as to rotate therewith, the radial arms being provided with bearings formed partly by means of bearing caps secured to the radial arms, the axes of the bearings so formed being aligned and substantially perpendicular to the axis of the drive shaft, propeller blades mounted in the bearings thus formed, and rotatable about their own axes as they are rotated with the drive shaft, the drive shaft having an axial opening, an independent shaft in the axial opening, means for drivably connecting the independent shaft to the propeller blades, so the blades will be moved about their own axes whenever the independent shaft is moved relative to the drive shaft, means for moving the independent shaft relative to the drive shaft, comprising a radial shaft carried by the drive shaft and rotatable therewith, the radial shaft being mounted for rotation about an axis perpendicular to the axis of the drive shaft, the said radial shaft having a driving connection with the independent shaft whereby the independent shaft will be moved relative to the drive shaft whenever the radial shaft is moved about its axis, means for rotating the radial shaft about its axis by power derived from the rotation of the drive shaft, and means carried by the drive shaft and drivably interposed between the independent shaft and the drive shaft for limiting the movement of the independent shaft relative to the drive shaft so as to prevent movement beyond predetermined limits.

11. In a variable pitch propeller, in combination, a drive shaft mounted for rotation about its own axis, the drive shaft having radial arms secured thereto, so as to rotate therewith, the radial arms being provided with bearings that are formed partly by means of bearing caps secured to the radial arms, the axis of the bearings so formed being substantially perpendicular to the axis of the drive shaft, propeller blades mounted in the bearings for rotation about their own axes, as they are rotated about the axis of the drive shaft, the drive shaft having an axial opening, an independent shaft located in the axial opening and drivably connected to the propeller blades by means that will move the blades about their own axes when the independent shaft is moved relative to the drive shaft, means carried by the drive shaft and rotatable therewith for moving the independent shaft relative thereto while the shaft is rotating comprising a hydraulic pump and a hydraulic motor, conduits extending between the pump and the motor for conducting a liquid from one to the other, the motor being drivably connected to the independent shaft, radial shafts also carried by the drive shaft and rotatable therewith, the radial shafts being mounted for rotation about axes that are perpendicular to the axis of the drive shaft, the radial shafts having driving connections with the hydraulic pump, whereby the pump and the hydraulic motor will be simultaneously operated whenever the radial shafts are turned about their axes, limiting means also carried by the drive shaft and rotatable therewith, comprising valves that are connected with the conduits and means interposed between the valves and the independent shaft for operating the valves to limit the extent of movement of the motor, the independent shaft and the propeller blades relative to the drive shaft as the latter is rotating about its axis.

12. In a variable pitch propeller, in combination, a drive shaft mounted for rotation about its own axis, the drive shaft having radial arms secured thereto, so as to rotate therewith, the radial arms being provided with bearings that are formed partly by means of removable bearing caps, the axes of the bearings so formed being substantially perpendicular to the axis of the drive shaft, propeller blades mounted in the bearings for rotation about their own axes, as they are rotated about the axis of the drive shaft, means for turning the blades about their own axes as they are rotating about the axis of the drive shaft, and means for limiting the extent of movement of the blades relative to the drive shaft as the latter is rotating about its axis.

13. In a variable pitch propeller, in combination, a drive shaft mounted for rotation about its own axis, the drive shaft having radial arms secured thereto that are rotatable therewith, the radial arms being provided with bearings whose axes are substantially perpendicular to the axis of the drive shaft, two propeller blades provided with root portions that overlap each other, one blade being provided with a cylindrical-like root portion for the reception of another blade root portion of smaller diameter, each blade root portion being provided with an annular thrust bearing member, nonrotatably secured with respect thereto, a radial bearing located between the two thrust bearing members that are secured to the blade root portions, the cylindrical root portion of the one blade being provided with bearings and bearing supports, one formed in the inner end of the cylindrical root portion and one formed in an annular member that is secured to the outer end of the cylindrical root portion, for the reception of the root portion of the blade of the smaller diameter, the blade root portions being thus journalled together and secured against longitudinal movement with respect to each other, and rotatable with respect to each other about a common axis, are secured in the bearings of the radial arms that are carried by the drive shaft, the bearings of the radial arms being formed partly by means of removable bearing caps secured to the radial arms, means for rotating the blades in their bearings while they are rotated about the axis of the drive shaft, and means for limiting the extent of movement of the blades relative to the drive shaft as the latter is rotating about its axis.

14. In a device of the class described, in combination, a drive shaft mounted for rotation about its own axis, a body carried by the drive shaft and rotatable therewith, but which is mounted for movement with respect thereto, a plurality of power transmission members carried by the drive shaft, rotatable therewith and mounted for movement with respect thereto, means for operatively interconnecting the power transmission members and the body so the body will be moved with respect to the drive shaft whenever the power transmission members are moved relative to the drive shaft, means for moving the power transmission members in the same direction and at different speeds with respect to the drive shaft by power derived from the rotation of the drive shaft, thereby producing a differential action between the power transmission members as they are moved relative to the drive shaft, and means operated by and associated with the differential movement between the power transmission members for automatically limiting and controlling the movement of the body relative to the drive shaft as the latter is rotating about its axis.

15. In a device of the class described, in combination, a drive shaft mounted for rotation about its own axis, a body carried by the drive shaft and rotatable therewith, but which is mounted for movement with respect thereto, a plurality of power transmission members carried by the drive shaft and rotatable therewith, the transmission members being so mounted that they may be moved with respect to the drive shaft while they are rotated therewith, means for operatively interconnecting the power transmission members and the body, so the body will be moved with respect to the drive shaft whenever the power transmission members are moved relative to the drive shaft, power driven means for moving the power transmission members with respect to the drive shaft, means for simultaneously turning the power transmission members in the same direction and at different speeds and means associated with and operated by the differential movement between the power transmission members for automatically limiting and controlling the movement of the body relative to the drive shaft as the latter is rotating about its axis.

16. In a device of the class described, in combination, a drive shaft mounted for rotation about its own axis, a body carried thereby and rotatable therewith and which is adapted to be moved with respect thereto, a plurality of power transmission members carried by the drive shaft, rotatable therewith, and mounted for rotary movement about an axis that is concentric with the axis of the drive shaft, power driven means for moving the power transmission members relative to the drive shaft as they are rotating therewith, means for operatively interconnecting the power transmission members with the body carried by the drive shaft, so the body will be moved with respect to the drive shaft whenever the power transmission members are moved with respect thereto, means for creating differential movement between the power transmission members, and means associated with and operated by the differential action between the power transmission members, for automatically limiting and controlling the movement of the body relative to the drive shaft as the latter is rotating about its axis.

17. In a device of the class described, in combination, a drive shaft mounted for rotation about its own axis, a body carried thereby and is rotatable therewith, that which is adapted to be moved with respect thereto as it is rotating therewith, a plurality of power transmission members carried by the drive shaft, and rotatable therewith, said members being mounted for movement about an axis that is concentric with the axis of the drive shaft, means for operatively interconnecting the power transmission members and the body, so the body will be moved with respect to the drive shaft whenever the power transmission members are moved relative thereto, means for moving the power transmission members relative to the drive shaft by power derived from the rotation of the drive shaft, means for moving the power transmission members in the same direction and at different speeds as they are moved relative to the drive shaft, means associated with and operated by the differential movement between the power transmission members for automatically limiting and controlling the movement of the body relative to the drive shaft as the latter is rotating about its axis.

18. In a device of the class described, in combination, a drive shaft mounted for rotation about its own axis, a body carried by the drive shaft and rotatable therewith, but which is movable with respect thereto as it is rotating therewith, the drive shaft having an axial opening, means for moving the body with respect to the drive shaft while the latter is rotating comprising an independent shaft located in the axial opening, two gear wheels operatively connected to the independent shaft, the independent shaft and the gear wheels being carried by the drive shaft and rotatable therewith, the axes of the gear wheels being concentric with the axis of the drive shaft, and mounted for movement with respect to the drive shaft while rotating therewith, means for operatively connecting the independent shaft and the gear wheels with the body, so the body will be moved with respect to the drive shaft, whenever the independent shaft and the gear wheels are moved with respect thereto, means carried by the drive shaft and rotatable therewith for moving the independent shaft and the gear wheels with respect to the drive shaft by power derived from the rotation of the drive shaft, means for moving one of the gear wheels and the independent shaft relative to the other gear wheel while the independent shaft and both gear wheels are moving with respect to the drive shaft, means operated by the differential action between the gear wheels and the relative movement between the gear wheels and the independent shaft for automatically controlling and limiting the extent of movement of the independent shaft and the body relative to the drive shaft as the latter is rotating about its axis.

19. In combination with a variable pitch propeller, a drive shaft mounted for rotation about its own axis, the drive shaft having an axial opening and radial arms secured thereto, so as to rotate therewith, the radial arms being provided with bearings that are partly formed by means of bearing caps, the axes of the bearings so formed being in alignment and substantially perpendicular to the axis of the drive shaft, propeller blades mounted in the bearings so formed for rotation about their own axes as they are rotating with the drive shaft, means for rotating the blades about their axes as they are rotating with the drive shaft, comprising an independent shaft located in the axial opening, the independent shaft being drivably connected to the propeller blades, so the blades will be moved about their own axes whenever the independent shaft is moved relative to the drive shaft, means for moving the independent shaft relative to the drive shaft, comprising two gear wheels carried by the drive shaft and rotatable therewith, the axes of the gear wheels being concentric with the common axis of the independent shaft and drive shaft, the gear wheels being mounted for movement longitudinally of the drive shaft as they are rotating therewith, means operatively connecting the gear wheels with the independent shaft, so the independent shaft and the propeller blades will be moved relative to the drive shaft whenever the gear wheels are moved relative thereto, means carried by the drive shaft and rotatable therewith for moving the gear wheels with respect to the drive shaft by power derived from the rotation of the drive shaft, means for moving the gear wheels relative to each other, and means operated by the relative movement between the gear wheels for automatically controlling the extent of relative movement between them, and for limiting the extent of movement of the independent shaft and propeller blades relative to the drive shaft, as the latter is rotating about its axis.

20. In a device of the class described, in combination, a drive shaft having an axial opening and mounted for rotation about its own axis, a body carried by the drive shaft and rotatable therewith, said body being movable with respect thereto, means for moving the body with respect to the drive shaft, comprising an independent shaft located in the axial opening of the drive shaft and rotatable therewith, but adapted to be moved with respect thereto, means for drivably connecting the body with the independent shaft, so the body will be moved relative to the drive shaft, whenever the independent shaft is moved with respect thereto, means for moving the independent shaft with respect to the drive shaft, comprising, two gear wheels carried by the drive shaft and rotatable therewith, said gears each having an operative connection with the independent shaft, the axes of the gear wheels being concentric with the common axis of the independent shaft and drive shaft, the two gear wheels being adapted to be moved with respect to the drive shaft, while rotating therewith, means for rotating the gear wheels about their own axes, and relative to the drive shaft by power derived from the rotation of the drive shaft, said means rotating the two gear wheels in the same direction and at different speeds whereby relative rotation between the two gear wheels is effected as they rotate relative to the drive shaft, and means for limiting the extent of relative movement between the two gear wheels, and for automatically controlling the movement of the body and the independent shaft relative to the drive shaft, as the latter is rotating about its axis.

21. In a device of the class described, in combination, a drive shaft mounted for rotation about its own axis, a body carried thereby and rotatable therewith, said body being movable with respect thereto, means for moving the body with respect to the drive shaft, comprising a power transmission member carried by the drive shaft and rotatable therewith, but which can be moved with respect thereto, the axis of the power transmission member being concentric with the axis of the drive shaft, means for drivably connecting the body with the power transmission member, so the body will be moved relative to the drive shaft whenever the power transmission member is moved with respect to the drive shaft, means for moving the power transmission member relative to the drive shaft, comprising two gear wheels that are carried by the drive shaft and rotatable therewith, said gears being operatively connected with the power transmission member, the axes of the gear wheels being concentric with the common axes of the power transmission member and the drive shaft, the two gear wheels being mounted for rotation relative to the drive shaft as they are rotating therewith, means for rotating the gear wheels about their axes and relative to the drive shaft, by power derived from the rotation of the drive shaft, means for rotating the two gear wheels in the same direction and relative to each other, and means operated by the relative rotation between the two gears for limiting the extent of relative rotation between them, and for automatically controlling the movement of the body and the power transmission member relative to the drive shaft as the latter is rotating about its axis.

22. In combination with a variable pitch propeller, a drive shaft mounted for rotation about its own axis, the drive shaft having an axial opening and radial arms secured thereto, and rotatable therewith, the radial arms being provided with bearings that are partly formed by means of bearing caps, the axes of the bearings so formed being in alignment and substantially perpendicular to the axis of the drive shaft, propeller blades mounted for rotation in the bearings while rotating with the drive shaft, means for rotating the blades about their own axis as they are rotating with the drive shaft comprising an independent shaft located in the axial opening, two gear wheels operatively connected to the independent shaft, the independent shaft and the two gear wheels being carried by the drive shaft and rotatable therewith, the gears and independent shaft being concentric with the axis of the drive shaft, and mounted for movement with respect thereto as they are rotating therewith, means for operatively connecting the independent shaft and the gear wheels with the body, so the body will be moved with respect to the drive shaft whenever the independent shaft and the gear wheels are moved relative to the drive shaft, means carried by the drive shaft and rotatable therewith for moving the independent shaft and the gear wheels with respect to the drive shaft by power derived from the rotation of the drive shaft, means for moving one of the gear wheels and the independent shaft relative to the other gear wheel, while the independent shaft and both gear wheels are moving relative to the drive shaft, and means operated by the differential action between the gear wheels and between the independent shaft and one of the gear wheels for automatically controlling and limiting the extent of movement of the independent shaft and the body relative to the drive shaft, as the latter is rotating about its axis.

23. In combination with a variable pitch propeller, a drive shaft mounted for rotation about its own axis, the drive shaft having an axial opening and radial arms secured thereto, so as to rotate therewith, the radial arms being provided with bearings that are formed in part by means of bearing caps, the axes of the bearings so formed being substantially perpendicular to the axis of the drive shaft, propeller blades mounted for rotation in the bearings, means for rotating the blades about their own axis as they are rotating with the drive shaft, comprising an independent shaft located in the axial opening, the independent shaft being drivably connected to the propeller blades, two gear wheels operatively connected to the independent shaft, the independent shaft and the two gear wheels having axes that are concentric with the axis of the drive shaft, all being carried by the drive shaft and rotatable therewith, and all being mounted for movement with respect to the drive shaft as they are rotating therewith, means for operatively connecting the independent shaft with the two gear wheels comprising a splined and threaded portion on the shaft, both of the gear wheels having central openings, one of the gear wheels having a key secured thereto that fits the spline in the independent shaft, whereby the independent shaft will be rotated about its axis whenever the gear wheel is rotated relative to the drive shaft, the other gear wheel being provided with threads in its opening that will engage the threaded portion of the independent shaft, the gear wheels being held against movement with respect to each other longitudinally of their axes, but both being movable longitudinally with respect to the independent shaft and drive shaft, power driven means carried by the drive shaft and rotatable therewith for moving the gear wheels and independent shaft with respect to the drive shaft, means for rotating the independent shaft and the gear wheels in the same direction relative to the drive shaft, and in the same direction relative to each other, said means rotating the independent shaft and one of the gear wheels relative to the other gear wheel as they are rotating in the same direction with respect to each other, thereby creating a comparatively slow differential action between the one gear wheel and the independent shaft relative to the other gear wheel, and means for automatically limiting the extent of movement of the independent shaft and body relative to the drive shaft as the latter is rotating about its axis.

24. In a device of the class described, in combination, a drive shaft mounted for rotation about its own axis and provided with an axial opening, a body carried by the drive shaft that is rotatable therewith and adapted to be moved with respect thereto as it is rotating therewith, means for moving the body with respect to the drive shaft, comprising an independent shaft located in the axial opening, the body being drivably connected with the independent shaft, two gear wheels operatively connected to the independent shaft, the independent shaft and the two gear wheels having axes that are concentric with the axis of the drive shaft, all being carried by the drive shaft and rotatable therewith, and all being mounted for movement with respect to the drive shaft as they are rotating therewith, means operatively connecting the independent shaft with the two gear wheels, comprising a splined and threaded portion on the independent shaft, both of the gear wheels having central openings, one of the gear wheels having a key secured thereto that fits the spline in the independent shaft, whereby the independent shaft will be rotated about its axis whenever the gear wheel is rotated relative to the drive shaft, the other gear wheel being provided with threads in its opening that engage the threaded portion of the independent shaft, the gear wheels being provided with means for holding them against movement with respect to each other longitudinally of their respective axes, but both gear wheels being movable longitudinally with respect to the independent shaft and drive shaft, power driven means carried by the drive shaft, and operated by power derived from the rotation of the drive shaft, for moving the gear wheels and the independent shaft with respect to the drive shaft, means for rotating the independent shaft and the gear wheels in the same direction relative to the drive shaft and in the same direction relative to each other, means for rotating the independent shaft and one of the gear wheels relative to the other gear wheel as they are rotating in the same direction with respect to each other, and means for creating a differential action between the independent shaft and the one gear wheel relative to the other gear wheel, comprising a radial shaft carried by the drive shaft and rotatable therewith, the radial shaft being mounted for rotation about an axis that is substantially perpendicular to the axis of the drive shaft, means for rotating the radial shaft about its own axis by power derived from the rotation of the drive shaft, both concentric gear wheels being located on the same side of the radial shaft, the concentric gears being of different diameters, means for rotating the gears that are concentric with the drive shaft by gears of suitable diameter secured to the radial shaft for creating the desired amount of differential action of the independent shaft and one of the gear wheels relative to the other gear wheel, and means for automatically limiting the extent of movement of the independent shaft and the body relative to the drive shaft as the latter is rotating about its axis.

25. In a device of the class described, in combination, a drive shaft mounted for rotation about its own axis, a bearing in which the drive shaft is journaled, the shaft being provided with an axial opening that extends from one side of the bearing to the other side, an independent shaft in the axial opening, a member carried by the drive shaft designed to be moved with respect thereto as it is rotated therewith, means interposed between the independent shaft and said member for moving the member with respect to the drive shaft whenever the independent shaft is moved relative to the drive shaft, power operated means carried by the drive shaft on the opposite side of the bearing from the member and drivably connected to the independent shaft for moving it relative to the drive shaft, and means for limiting the extent of movement of the independent shaft and member relative to the drive shaft as the latter is rotating about its axis.

26. In a variable pitch propeller, in combination, a drive shaft mounted for rotation about its own axis, the drive shaft having radial arms that are rotatable therewith, the radial arms being provided with coaxial bearings, the common axis being perpendicular to the axis of the drive shaft, two propeller blades provided with root portions that overlap each other, one blade having a hollow cylindrical root portion for the reception of the root portion of the other blade, which is of such diameter that it can be inserted in the opening, means for journaling the overlapping root portions of the blades together to prevent relative longitudinal movement while permitting the two blades to be rotated relative to each other about a common axis, the blades, with the root portions thus connected being secured in the bearings of the radial arms, means for rotating the blades relative to each other while they are rotated about the axis of the drive shaft, and means for limiting the extent of movement of the blades relative to each other and relative to the drive shaft while the latter is rotating about its axis.

27. In a device of the class described, in combination, a drive shaft mounted for rotation about its own axis, a body carried by the drive shaft and rotatable therewith, but which is mounted for movement with respect thereto, a plurality of power transmission gears carried by the drive shaft and rotatable therewith, the transmission gears being so mounted that they may be moved with respect to the drive shaft while they are rotated therewith, means for operatively interconnecting the power transmission gears with the body, so the body will be moved with respect to the drive shaft whenever the power transmission gears are moved relative thereto, power driven means for moving the power transmission gears with respect to the drive shaft and in the same direction and relative to each other, and means operated by the relative movement between the power transmission gears for limiting the movement of the body relative to the drive shaft as the latter is rotating about its axis.

28. In a device of the class described, in combination, a drive shaft mounted for rotation about its own axis, the drive shaft having an axial opening, a body carried by the drive shaft and rotatable therewith and which is adapted to be moved with respect thereto, a plurality of power transmission members carried by the drive shaft, rotatable therewith and mounted for movement about an axis that is concentric with the axis of the drive shaft, power driven means for moving the power transmission members relative to each other and relative to the drive shaft as they are rotating therewith, an independent shaft in the axial opening in the drive shaft, said independent shaft forming part of a mechanism for interconnecting the power transmission members and the body for moving the body with respect to the drive shaft whenever the power transmission members are moved with respect thereto, and means operated by the relative movement between the power transmission members for automatically limiting the movement of the body relative to the drive shaft while the latter is rotating.

29. A drive shaft mounted for rotation in a plurality of axially aligned bearings, the drive shaft having an axial opening, an independent shaft located in the axial opening, a body carried by the drive shaft and mounted for movement with respect thereto as it is rotated therewith, means connecting the independent shaft with the body, so the body will be moved relative to the drive shaft whenever the independent shaft is moved with respect thereto, power operated means mounted on the drive shaft between two adjacent drive shaft bearings, and operatively connected to the independent shaft for moving it relative to the drive shaft, and means limiting the movement of the independent shaft relative to the drive shaft as the latter is rotating about its axis.

30. In combination with a variable pitch propeller, a drive shaft mounted for rotation in a plurality of bearings, the drive shaft having an axial opening, propeller blades carried by the drive shaft, and mounted for rotation about axes substantially perpendicular to the axis of the drive shaft as they are rotated therewith, means connecting the independent shaft with the propeller blades, so the blades will be moved about their axes whenever the independent shaft is moved relative to the drive shaft, power operated means located between two adjacent drive shaft bearings, and mounted on the drive shaft, same being operatively connected to the independent shaft for moving the independent shaft in either direction relative to the drive shaft, and means limiting the movement of the independent shaft relative to the drive shaft as the latter is rotating about its axis.

In testimony whereof I affix my signature.

DANIEL G. LILLEY.